United States Patent [19]

Zachary

[11] Patent Number: 4,648,711
[45] Date of Patent: Mar. 10, 1987

[54] SIGHT TUBE ASSEMBLY AND SENSING INSTRUMENT FOR CONTROLLING A GAS TURBINE

[75] Inventor: Richard E. Zachary, Clinton, La.

[73] Assignee: The Dow Chemical Company, Midland, Mich.

[21] Appl. No.: 730,007

[22] Filed: May 2, 1985

Related U.S. Application Data

[63] Continuation-in-part of Ser. No. 618,658, Jun. 8, 1984, abandoned.

[51] Int. Cl.[4] .............................. G01J 5/48; G01J 5/60
[52] U.S. Cl. ........................................ 356/44; 356/43; 374/125; 374/130
[58] Field of Search .................................. 356/43–50, 356/241; 350/508, 584, 96.15, 96.18, 96.20; 374/121, 125, 130, 144, 208–209; 415/118; 250/227, 554

[56] References Cited

U.S. PATENT DOCUMENTS

| | | | |
|---|---|---|---|
| 2,576,514 | 11/1951 | Bianco et al. | 374/125 |
| 3,436,965 | 4/1969 | Land | 374/125 |
| 4,306,835 | 12/1981 | Hurley | 356/43 X |
| 4,411,533 | 10/1983 | Loftus et al. | 356/43 X |

OTHER PUBLICATIONS

Curwen, "Turbine Blade Radiation Pyrometer System", Aircraft Engineering, vol. 44, No. 12, Dec. 1972, pp. 16–21.

Primary Examiner—Vincent P. McGraw
Assistant Examiner—Robert D. V. Thompson, III
Attorney, Agent, or Firm—V. Dean Clausen; Arthur J. Young

[57] ABSTRACT

A slight tube assembly, in combination with a sensing instrument, such as an optical pyrometer, for use in continuously monitoring the temperature of the first row of rotating blades in large gas turbines, particularly the type used in industry. Temperature data received by the pyrometer unit is fed to a control circuit, which regulates fuel input to the tubine to control the firing temperature. The key to obtaining reliable blade temperature data in the practice of this invention is the position of the sight tube in the turbine, which enables the pyrometer to "view" the rotating blades along a direct line of sight that penetrates a hot gas duct, but not the turbine section of the engine.

8 Claims, 4 Drawing Figures

SIGHT TUBE ASSEMBLY AND SENSING INSTRUMENT FOR CONTROLLING A GAS TURBINE

CROSS REFERENCE TO RELATED APPLICATION

This is a continuation-in-part of U.S. application Ser. No. 618,658, filed June 8, 1984, now abandoned.

BACKGROUND OF THE INVENTION

Broadly, the invention relates to control of a gas turbine. More specifically, the practice of the invention involves the use of a sight tube assembly, in combination with a sensing instrument, to continuously monitor the rotating blades in a gas turbine.

Utility companies and other industries use large, stationary gas turbines to drive generators, pumps, or other types of machines. In the turbine section of the engine there are several rows of cup-shaped blades, known as turbine blades, which are mounted on a rotor shaft. A gas heated to extremely high temperatures (often above 1800° F.) is directed against the turbine blades, causing them to rotate and thus drive the rotor shaft. Before each row of rotating turbine blades is a row of stationary guide vanes, which are a part of the turbine section structure. As the hot gas moves through the turbine section, each row of guide vanes directs the flow of the gas so that it impinges on the rotating blades in the next row at the proper angle.

Power output and fuel (thermal) efficiency of the gas turbine increase as the firing temperature increases. The service life of the turbine components (turbine blades and guide vanes) decreases with increasing temperature. There is thus an optimum firing temperature for which power production is maximized, fuel consumption (per unit of power) is minimized and the turbine components retain their integrity for their full design life.

The first row of guide vanes and the first row of turbine blades operate at higher temperatures than do the successive rows of guide vanes and turbine blades. (The hot gas cools as it expands from the high pressure in the turbine engine to the near-atmospheric pressure in the turbine exhaust duct.) At present there is no reliable method to directly monitor the temperatures of the first row of guide vanes and the first row of turbine blades in large industrial gas turbines. Thermocouples are short-lived at such temperatures. Also, they are not easily adapted to measure the temperature of the rotating turbine blades, which historically have been the components whose failure has caused the gas turbine engines to be seriously damaged when overfired. Thus, it is most desirable to directly monitor the metal temperature of the first row of rotating turbine blades.

At present, the average firing temperature is usually calculated in a control processor, which receives as input data the average turbine exhaust temperature and the compressor-discharge pressure of the gas turbine. The control processor modulates the fuel supplied to the combustor (or combustors) in the engine, thus controlling the gas temperature at the inlet of the turbine section of the engine.

Optical pyrometers are presently used in many military aircraft gas turbine engines. These pyrometers generally employ a fiber-optic conduit, which terminates in the engine, a line of sight to the blades being provided through components of the turbine section of the engine. Components of the optical pyrometer system internal to the engine are serviced when the engine is not in operation.

One of the better known prior optical pyrometer systems which may be used for measuring blade temperatures and controlling operation of gas turbines has been developed by Land Turbine Sensors, Inc. At present the Land pyrometer systems are used with fiber optics primarily for in-flight temperature monitoring of engines on jet aircraft, and for obtaining blade temperature profiles in jet aircraft and other turbine engines mounted on test stands. There are several other pyrometer systems available which can be used for measuring turbine blade temperatures, but Applicant is not aware of any system that is readily adaptable to industrial-size gas turbines.

Some of the drawbacks of the known optical pyrometer temperature measuring systems will now be discussed. Using the Land pyrometer system as a typical example, the transducer of this instrument comprises a fiber optic head, a flexible light guide and a detectoramplifier module. The sight tube component of this system is mounted on the turbine engine, such that the lower end passes through the turbine section of the engine housing and fastens into an opening between two vanes in the first row of the stationary guide vane section. The fiber optic head is connected into the upper end of the sight tube, and the probe for the optic head extends downwardly into the sight tube. At the lower end of the probe is a viewing lens, which is positioned a short distance behind the sight tube opening through the guide vane section. This allows the pyrometer to "view" the first row of the rotating turbine blades.

The sight tube includes an air purge inlet near its upper end. Air for cooling the probe and purging the lens is directed through the inlet and flows downwardly through a small annular space between the probe and the inside of the sight tube. The flexible fiber optic light guide is connected at one end into the optic head and at its opposite end into the detectoramplifier module, the module being enclosed in a housing and mounted in a remote location.

A major disadvantage of the Land system is that some of the transducer components must operate within the severe environment of the turbine engine, where they are subjected to high temperatures and pressures, vibration, and contaminants. Because these components are positioned within the engine environment, the engine must be shut down to repair or replace such parts. The penetration of the lower end of the sight tube through the first row of the stationary guide vane section is particularly undesirable in large industrial turbines, because of the difference in construction from aircraft gas turbine engines.

Another drawback of the Land system is that the line of sight from the optic head to the first row of turbine blades is restricted to a given size and position. In addition, the snug fit of the probe inside the sight tube does not allow for adjustment of the line of sight to move the target spot to different locations on the rotating blade surfaces. This limitation is undesirable, since the "fixed" target may not be the hottest part of the turbine blade. For example, scale buildup on the turbine blades can have an adverse effect on the temperature readings Therefore, if the target spot falls on a part of the blade that is scaled over the temperature readings will probably be inaccurate.

The optical pyrometer and sight tube assembly of this invention has distinct advantages over the Land pyrometer system and the other systems described above for measuring blade temperatures in turbine engines. For example, the pyrometer and detector components of this invention are fastened to the sight tube at a position that is completely outside the high temperature and high pressure environments of the turbine engine. The sight tube is positioned in the turbine such that the pyrometer unit has a direct line of sight to the first row of the turbine blades. At the same time, the line of sight can be moved within the sight tube, so that the pyrometer can scan the blade surfaces to find the hottest spot, or the coolest spot. This invention also includes a means for isolating the pyrometer unit from the engine environment, to perform service work, or to remove the pyrometer, without shutting the turbine down. Another advantage of this invention is that the sight tube structure provides an excellent view of the rotating turbine blades without penetrating the stationary guide vane section or other parts of the turbine section structure.

SUMMARY OF THE INVENTION

In general, the present invention provides an improved gas turbine that includes a plurality of movable blades mounted on a shaft, at least one conduit forming a passageway for hot gas, means for directing the hot gas against the movable blades, said means including a plurality of gas-directing members and support means for the gas-directing members, and an outer casing for the gas turbine. The improvement comprises a substantially straight pathway leading from the outer surface of the casing and passing through the wall of the conduit into the passageway, which pathway is directed at the movable blades. The pathway of the present invention provides functional communication between the movable blades and means for sensing and monitoring the condition of the movable blades.

The present invention also provides a method for monitoring movable blades mounted on a shaft in a gas turbine, including a conduit forming at least one passageway for hot gas, means for directing the hot gas against the movable blades, said means including a plurality of gas-directing members and support means for the gas-directing members, and an outer casing for the gas turbine. The method comprises the step of sensing the condition of the movable blades by sensing means in functional communication with the blades through a substantially straight pathway leading from the outer surface of the casing and passing through the wall of the conduit into the passageway, which pathway is directed at the movable blades.

To find one or more suitable pathways in accordance with the present invention, the following procedure may be used. Starting where the movable blades are positioned, a pair of adjacent gas-directing members in the first row is selected for a line of sight passing between the pair of gas-directing members from the first row of movable blades. A set of lines is then generated, the lines originating at the first row of movable blades, passing between the selected pair of adjacent gas-directing members, and terminating at the outer casing. This establishes a set of pathways from the outer surface of the casing through the wall of the conduit into the passageway for the hot gas. The pathways are directed at the movable blades.

It is then determined where each pathway will intersect the various components of the gas turbine. An evaluation is then made of the effect of penetrating, with each pathway, the components of the gas turbine which the pathway will intersect. Based on this evaluation, one of the possible pathways is selected as the pathway to use. The choice of pathway may be further optimized by repeating the foregoing procedure for at least one other pair of adjacent gas-directing members, evaluating each pathway, and selecting the best pathway found.

A "pathway" is defined herein as a pathway that is substantially straight and capable of transmitting a signal indicative of the condition of the movable blades from the blades to means for sensing the condition of the blades. Included in this definition are an open pathway, an unobstructed pathway, an optical pathway which may include members or structures transparent to the wavelength of light being used to establish communication between the blades and the sensing means, a pathway pervious to sound, and a pathway including a probe, such as a fiber-optics probe. The pathway may include control means, such as valves or stopcocks, which may temporarily render the pathway impervious to the transmission of signals when the valves or stopcocks are closed, but which render the pathway pervious to such transmission when the valves or stopcocks are open.

Preferably, the pathway is disposed within a sight tube. The sight tube is sealed at its outer end with a transparent member which serves as a sight glass, and the other end of the sight tube extends at least to about the wall of the conduit, in order to substantially restrict the flow of gas into the passageway from the space between the wall of the conduit and the wall of the outer casing. In practice, usually the flow of gas around the sight tube into the passageway is substantially restricted by such means as close-proximity fits, slip fits, expansion joints, telescoping sections, or other means well known in the art.

The purpose of using slip or expansion joints with the sight tube is to allow for the free and independent expansion of the individual turbine conduit and sight tube components, while continuing to maintain the restriction of gas flow into the passageway. Alternatively, the components may be fastened to one another, if their free and independent expansion is not required or desired. The line of the pathway passes between a pair of adjacent vanes in the first row of the gasdirecting inlet guide vanes. The line of the pathway does not pass through the support means for the gasdirecting inlet guide vanes.

Means that may be used to sense the condition of the blades include, for example, optical pyrometers, spectrophotometers, and vibration meters. Conditions that can be sensed include blade temperature, extent of scale buildup on the blade surface, amplitude of vibration of the blade, and chemical composition of the surface of the blade. The temperature of the blade might be sensed, for example, by an optical pyrometer, and the composition of surface buildup by a spectrophotometer. Means used to sense the amplitude of vibration might include a stroboscope and a light beam, which could be a laser beam. The sensing means are aligned with the pathway and directed at the movable blades.

The invention also provides an optical pyrometer and sight tube assembly to continuously monitor blade temperature and utilize this data to control the firing temperature of a gas turbine. In a preferred embodiment the optical pyrometer unit has a tubular member that extends from the pyrometer unit to define a coupler neck with an open end. The invention includes a valve, having open and closed positions, with one end of the valve being connected to the pyrometer coupler neck. A transparent member that serves as a sight glass is positioned between the pyrometer coupler neck and the valve. Another tubular member defines a nozzle that is fastened to the casing member of the turbine. At the opposite end the nozzle is connected to the valve.

A sight tube is positioned inside the nozzle, and a flanged end of this tube is clamped between the nozzle and the valve. At the opposite end, the sight tube extends through a hot gas duct member of the turbine. The outside diameter of the sight tube is smaller than the inside diameter of the nozzle, so that an annular space is defined between the sight tube and the nozzle. The gas turbine includes a turbine section in which there are several rows of stationary guide vanes and several rows of rotating turbine blades, which are positioned behind the guide vane rows. The end of the sight tube, which terminates at the hot gas duct, is in front of the first row of stationary guide vanes, and this row of vanes is in front of the first row of the rotating turbine blades.

The sight tube is positioned in the turbine section such that a line of sight can pass directly from the pyrometer unit through the sight glass, the sight tube, and the first row of stationary guide vanes, and impinge on a selected area of the first row of the rotating turbine blades. No physical penetration of the turbine section is made. Only one hot gas duct need be penetrated in order to view the blades. With the valve in its open position, the pyrometer unit will continuously monitor the temperature of the rotating blades, and this data can be used to control the firing temperature of the turbine. Moving the valve to the closed position isolates the sight glass and pyrometer unit from the environment of the turbine section, to permit quick servicing or replacement of the pyrometer unit or sight glass while the turbine continues to run.

DESCRIPTION OF THE INVENTION

Figure 1:
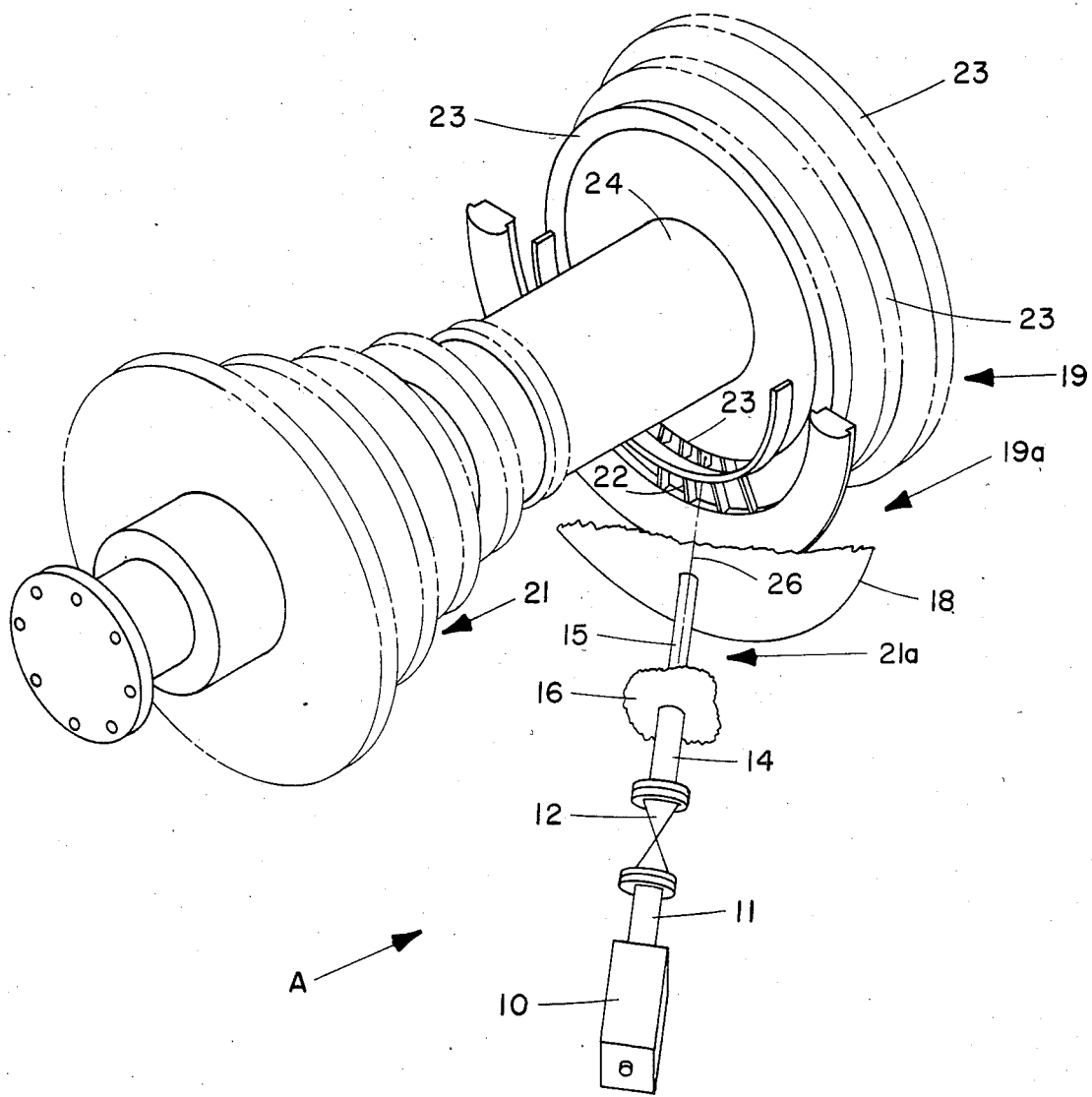
FIG. 1 is a partial isometric view of a turbine, which schematically illustrates an optical pyrometer connected to a sight tube assembly. In this view the pyrometer and sight tube assembly are installed in a typical operating position on a gas turbine.
Figure 2:
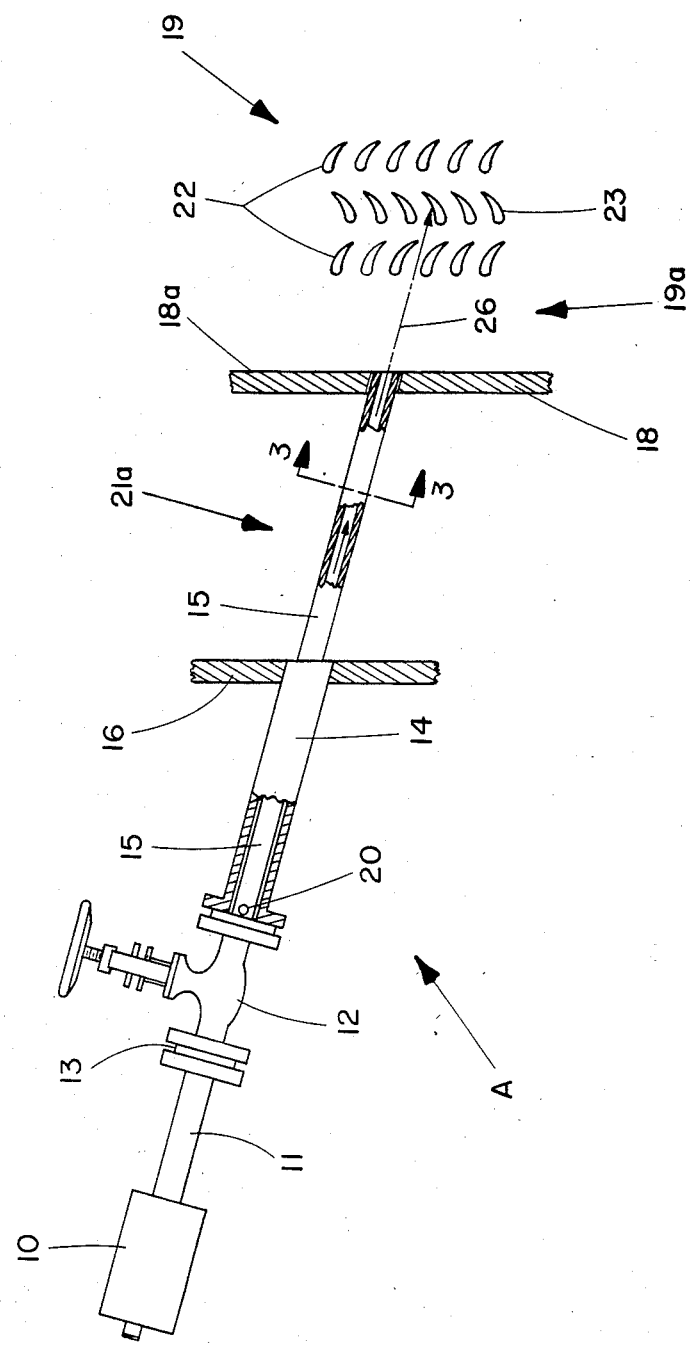
FIG. 2 is a partial auxiliary elevation view of the optical pyrometer and sight tube assembly illustrated in FIG. 1.

Referring to the drawings, particularly FIGS. 1 and 2, the letter A indicates generally one embodiment of the optical pyrometer and sight tube assembly of this invention. Numeral 10 refers to the optical pyrometer unit, and a tubular member extending from the pyrometer unit defines a coupler neck 11. The flanged end of coupler neck 11 is connected to one of the flanged ends of the valve 12. A sight glass (pressure seal) 13 is sandwiched between the flanged ends of the coupler neck 11 and valve 12.

The pyrometer unit 10 and sight glass 13 can be isolated from the environment of the turbine inlet section 19a by closing valve 12. Valve 12 can be operated manually or automatically, by electrical or pneumatic control systems. Suitable valves for this purpose are those in which there is a clear line of sight through the valve bore when the valve is in open position. Examples of such valves are gate valves, ball valves, and plug valves.

Figure 4:
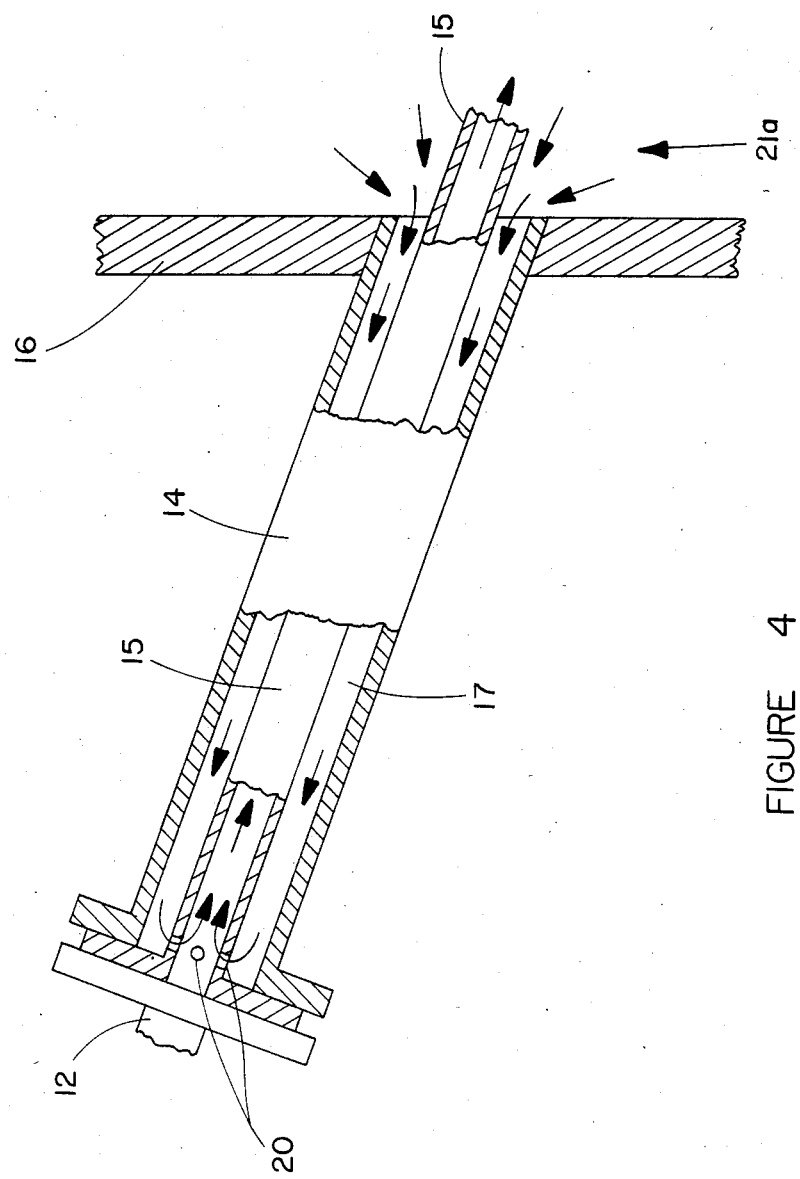
FIG. 4 is an enlarged fragmentary view of the sight tube assembly shown in FIG. 2. This view particularly illustrates an annular space between the sight tube and nozzle, and openings in the sight tube, which provide means for purging the sight tube of unwanted vapor phase and particulate materials.

The sight tube assembly is made up basically of the sight tube 15 and a tubular member which defines a nozzle 14. The front end of the nozzle 14, which is flanged, fastens to the flanged end of valve 12, which is opposite from coupler neck 11. The opposite end of the nozzle 14 (not flanged) is fastened to the turbine casing 16. The sight tube 15 fits inside the nozzle 14, and the flange on the front end of this tube is clamped between the flanged ends of the nozzle and valve. The outside diameter of the sight tube 15 is slightly smaller than the inside diameter of the nozzle 14, such that an annular space 17 is defined between the sight tube 15 and nozzle 14, as best shown in FIG. 4.

The lower end of sight tube 15 extends through a hot gas duct member 18 and prevents excessive leakage of compressor discharge air into the turbine inlet section 19a. As best shown in FIG. 2, it is preferred that the lower end of the sight tube be flush with the inside surface 18a of the duct member 18. Beyond the surface 18a is the turbine inlet section 19a, where the gas temperatures are extreme. In the practice of this invention, the reason for not allowing the sight tube 15 to extend into the hot gas duct is to lessen the chance that thermal degradation will cause the end of the tube to fragment and break off. The sight tube 15 also has several small openings, indicated by numeral 20, which are located near the flanged end of the tube.

The compressor discharge section of the turbine compressor 21 is an area that lies between casing 16 and the hot gas duct 18 (or ducts), as indicated generally by the numeral 21a. Within the turbine section 19 there are several rows of stationary guide vanes, as indicated by numeral 22, and several rows of rotating turbine blades, indicated by numeral 23. As best shown in FIG. 1, each row of turbine blades is mounted on a rotor shaft 24, and each row of the stationary guide vanes 22 is mounted within the turbine section, such that a row of guide vanes 22 is positioned before each row of the turbine blades 23.

Operation

The invention can be illustrated by describing a typical operation in which the pyrometer unit continuously monitors the temperature of the first row of the rotating turbine blades 23, and utilizes this data to automatically control the firing temperature of the turbine. There are several commercially available optical pyrometer systems that may be used in the practice of this invention. One of these systems, known as a two-color pyrometer, is preferred as the primary temperature monitoring system in this invention. The detector of this unit responds to two wavelength bands of radiation, in which the temperature data is calculated as a ratio product of the two wavelengths.

A particular advantage of this unit is its ability to compensate for changes in emissivity from the rotating blades. Another advantage is that the unit can compensate for variations in the transmission of the radiation through the sight glass, which can be caused by films or other materials that might obscure the view through the glass. Since the detector has a slow speed of response, a profile of individual blade temperatures cannot be obtained, but it does have the capability of reading out average temperature values.

Other conventional optical pyrometer systems utilize a single band wavelength to detect radiation. A particular advantage of some of these systems is that the detector has a high speed of response to the radiation. This enables the pyrometer unit to "read" individual blade temperatures and thus find the hottest blades in the turbine section. One of the drawbacks of this unit is the emissivity variable, which is an integral part of the detector function. This variable makes the unit less reliable over a long period of time for obtaining average blade temperature readings.

Figure 3:
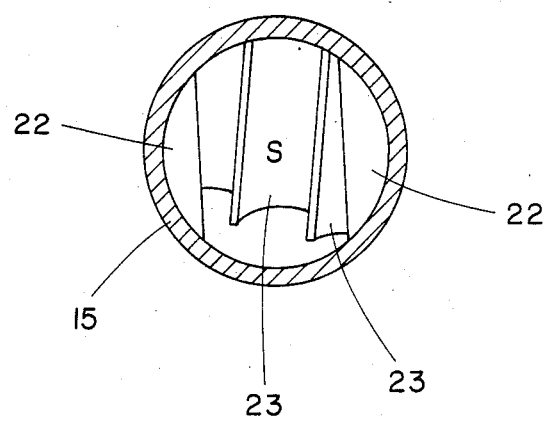
FIG. 3 is a view taken along line 3—3 of FIG. 2. The illustration here is a view of the rotating turbine blades, as seen through the sight tube.

To provide for the temperature monitoring operation, the optical pyrometer unit 10 and the sight tube assembly are installed, as previously described, in a position such as that shown in FIGS. 1 and 2. When the installation is complete, the turbine is started and valve 12 is moved to its open position. The pyrometer unit 10 is then adjusted to give a direct and clear view of a selected target spot on the first row of the rotating turbine blades 23. In FIG. 3 a typical target spot is indicated schematically by a small "s" that appears on one of the turbine blades that is passing through the field of view.

As illustrated in the drawings, the line of sight, indicated by numeral 26, follows a direct path from the pyrometer unit 10, through valve 12, sight tube 15, and passes through the opening between two of the stationary guide vanes 22 in the first row of the vanes. As mentioned earlier, the first row of the stationary guide vanes 22 is positioned ahead of the first row of turbine blades 23.

It is the actual positioning of the sight tube 15 in the turbine engine that enables the pyrometer unit 10 to view the rotating turbine blades 23 along a direct line of sight. This capability of the optical pyrometer 10 to view the turbine blades 23 along the direct line of sight, which does not pass through any component of the turbine section, as illustrated herein, is believed to be a unique improvement over any known technique for measuring turbine blade temperatures by optical pyrometry.

As explained earlier, the function of the optical pyrometer unit 10 is to continuously monitor and sense the temperature of the turbine blades 23. The temperature data is transmitted to an electronic control circuit (not shown), which controls various turbine operating conditions, such as inlet gas temperature, outlet gas temperature, fuel input, and the like. This enables the control circuit to automatically regulate the fuel supply to the turbine, and thus maintain the firing temperature at a desired level.

During operation of the turbine, water vapor inside the turbine structure can move upwardly through the sight tube 15 and valve 12 and condense on the inside of the sight glass 13. The resulting condensate film on the sight glass usually obscures the line of sight sufficiently to produce incorrect temperature readings. This problem is solved by purging the sight tube 15 with pressurized air from the compressor discharge section 21a. For example, air in the compressor discharge section 21a is at about 150 psi, which is about 5 psi higher than the inlet pressure of the gas in the turbine inlet section 19a. This pressure differential allows the air in the compressor discharge section 21a to flow back through the annular space 17 between nozzle 14 and sight tube 15. The air in space 17 passes through the openings 20, and flows through the sight tube 15 to the turbine section. As the air moves through the sight tube 15, it carries any water vapor with it.

The sight glass 13 has the function of a viewing window for the pyrometer unit 10. Since the sight glass 13 is a solid piece of material with no openings therein, it functions as the critical pressure seal between the turbine and the pyrometer unit 10 when valve 12 is in the open position.

In the preferred embodiment of this invention, as described and illustrated herein, valve 12 provides a means for isolating the sight glass 13 and pyrometer unit 10 from the turbine engine environment. As pointed out earlier, this is an important feature of this invention, because it makes it possible to remove and replace the pyrometer unit 10 or the sight glass 13, or to service the instrument while the turbine is running. The scope of this invention also includes a second embodiment in which the isolation valve 12 is omitted from the structure illustrated herein. In this embodiment the coupler neck 11 of the pyrometer unit 10 connects directly to the flanged ends of the nozzle 14 and sight tube 15, with the sight glass 13 being positioned between the flanged ends of the coupler neck and the sight tube.

As described earlier, it is the actual positioning of the sight tube in the turbine engine that enables the pyrometer unit to view the rotating turbine blades along a direct line of sight. The practice of this invention also includes being able to install the sight tube in a position that will allow the pyrometer unit, or another sensing instrument, to view other components internal to the engine, such as the stationary guide vanes, the hot gas duct, the combustors, or other parts.

For example, as shown in FIG. 3, the sight tube 15 provides a direct pathway that permits the pyrometer 10 to view both the rotating turbine blades and at least part of adjaent guide vanes 22 that are located in the first row of the stationary guide vanes.

For the sake of simplicity, the present invention has been illustrated in the drawings as a gas turbine utilizing a single hot gas conduit. The invention is applicable to gas turbines that include a plurality of hot gas conduits, as indicated by the description herein. In fact, the invention was first utilized in a multiple-conduit turbine. The number of hot gas conduits is a matter of gas turbine design, and bears no relationship to the subject matter of the present invention.

The invention claimed is:

1. In combination, a sight tube assembly and an optical pyrometer, for controlling the firing temperature of a gas turbine, which comprises:
   an optical pyrometer unit that includes a first tubular member extending from the pyrometer unit, the first tubular member defining a coupler neck having an open end;
   a valve having open and closed positions, the valve having a first end and a second end, the first end being connected to the open end of the pyrometer coupler neck;
   a transparent member that serves as a sight glass, the sight glass being positioned between the pyrometer coupler neck and the first end of the valve member;

a second tubular member that defines a nozzle, the nozzle having a first end fastened to a casing member of the turbine, the nozzle having a second end fastened to the second end of the valve;

a sight tube that fits inside the nozzle, the sight tube having a first end and a second end, the first end of the sight tube being positioned between the second end of the valve and the second end of the nozzle, the second end of the sight tube extending into the wall of a hot gas duct member on the turbine, and the outside diameter of the sight tube being smaller than the inside diameter of the nozzle, such that an annulus is defined between the sight tube and the nozzle; and a turbine section in the gas turbine that includes several rows of stationary guide vanes and several rows of rotating turbine blades, the second end of the sight tube being positioned before the first row of stationary guide vanes, and the first row of stationary guide vanes being positioned before the first row of rotating turbine blades;

the optical pyrometer sight tube assembly being positioned in the gas turbine such that a line of sight passes directly from the pyrometer unit through the sight glass and the sight tube, and between a pair of adjacent guide vanes in the first row of stationary guide vanes, to impinge on a selected area of the first row of rotating turbine blades; wherein, when the valve is in its closed position, the sight glass and pyrometer unit are isolated from the environment of the turbine section.

2. The combination of claim 1 in which the annulus surrounding the sight tube is in fluid communication with a compressor discharge section of the gas turbine, the sight tube has several openings therein, the openings are positioned near the first end of the sight tube and in fluid communication with the annulus, so that the sight tube can be purged with pressurized air from the compressor discharge section.

3. In a gas turbine that includes an outer casing, a compressor discharge section that contains a body of pressurized air, a plurality of movable blades mounted on a shaft, at least one hot gas duct member, a plurality of gas-directing members, and support means for the gas-directing members, the improvement which comprises:

a substantially straight pathway that extends from the outer surface of the turbine casing through a wall of the hot gas duct member;

the pathway is directed at the movable blades, to provide functional communication between the movable blades and a means for sensing the condition of the movable blades, and the sensing means is positioned exterior to the outer surface of the casing;

the gas-directing members are defined by at least one row of stationary guide vanes, and the pathway passes between a pair of adjacent guide vanes in said row without intersecting the support means for the gas-directing members; and part of the length of the pathway is disposed within a sight tube that has an outer end and an internal end, the outer end of the sight tube is sealed with a sight glass, and the internal end of the sight tube extends into the wall of the hot gas duct member, so that the internal end restricts the flow of pressurized air from the compressor discharge section into the hot gas duct member.

4. The gas turbine of claim 3 in which the sensing means includes an optical pyrometer, and means for adjusting the pyrometer, and the pyrometer is aligned with the pathway and adjusted, so that it can directly view the movable blades from its position exterior to the engine.

5. The gas turbine of claim 3 which includes a turbine section, the support means for the gas-directing members are located in the turbine section, and the internal end of the sight tube does not extend into the turbine section.

6. The gas turbine of claim 3 in which the sight tube is in fluid communication with the compressor discharge section of the gas turbine, and the sight tube has at least one opening therein for purging the sight tube with pressurized air from the compressor discharge section.

7. In a gas turbine that includes a casing section, at least one hot gas duct member, several rows of stationary guide vanes, and several rows of rotating turbine blades, the improvement which comprises:

a means for sensing the condition of the stationary guide vanes and the rotating turbine blades, and a means for adjusting the sensing means;

a sight tube having an outer end and an internal end, the outer end is sealed by a sight glass and it extends through the casing section, and the internal end is positioned inside the turbine ahead of the stationary guide vanes;

the sight tube defines a direct pathway along which the sensing means can view both a selected area of a pair of adjacent guide vanes in the first row of stationary guide vanes, and a selected area of the rotating turbine blades; and the sensing means is adjusted to align it with the direct pathway, so that it can directly view either the selected area of the stationary guide vanes, or the selected area of the rotating turbine blades, to thereby sense the condition of either the stationary guide vanes, or the rotating turbine blades.

8. The gas turbine of claim 7 in which the sensing means is an optical pyrometer, and the pyrometer is used to sense the temperature of the rotating turbine blades, or the temperature of the stationary guide vanes.

* * * * *